United States Patent
Mattes et al.

(10) Patent No.: US 9,696,457 B1
(45) Date of Patent: Jul. 4, 2017

(54) INFRARED PRESENCE SENSING WITH MODELED BACKGROUND SUBTRACTION

(71) Applicant: Excelitas Technologies Singapore PTE Ltd., Singapore (SG)

(72) Inventors: Markus Mattes, Ingelheim (DE); Prometeusz Jasinski, Ingelheim (DE)

(73) Assignee: Excelitas Technologies Singapore PTE Ltd., Singapore (SG)

( * ) Notice: Subject to any disclaimer, the term of this patent is extended or adjusted under 35 U.S.C. 154(b) by 0 days.

(21) Appl. No.: 15/245,773

(22) Filed: Aug. 24, 2016

(51) Int. Cl.
*G01V 8/00* (2006.01)
*G01J 5/00* (2006.01)

(52) U.S. Cl.
CPC .................................... *G01V 8/00* (2013.01)

(58) Field of Classification Search
CPC ....... A61B 5/11; A61B 5/1116; A61B 5/1117; G01J 5/0022; G01J 5/0025; G01S 17/00; G01S 17/88; G01S 17/89; G01V 8/00; H04N 5/33
See application file for complete search history.

(56) References Cited

U.S. PATENT DOCUMENTS

| | | | |
|---|---|---|---|
| 6,384,414 B1 * | 5/2002 | Fisher | G01J 5/08 250/339.05 |
| 9,217,672 B2 | 12/2015 | Schilz et al. | |
| 9,377,365 B2 | 6/2016 | Schilz et al. | |
| 9,410,848 B2 | 8/2016 | Schilz et al. | |
| 2005/0077469 A1 * | 4/2005 | Kaushal | B60R 21/01516 250/330 |
| 2014/0002667 A1 * | 1/2014 | Cheben | G01N 21/3518 348/164 |
| 2015/0379851 A1 * | 12/2015 | Diels | G08B 21/043 340/573.1 |
| 2016/0138976 A1 | 5/2016 | Schilz et al. | |

\* cited by examiner

*Primary Examiner* — Mark R Gaworecki
(74) *Attorney, Agent, or Firm* — Peter A. Nieves; Sheehan Phinney Bass & Green PA (57) ABSTRACT

A motion sensing device includes an infrared radiation (IR) sensor configured receive signal IR from a warm object and background IR to produce a direct current output. A first transformation filter receives the direct current output and produces a filtered background. A second transformation filter receives the direct current output and produces a filtered signal. A rating compares the filtered signal and the filtered background to produce a result signal based on a detected difference between the filtered signal and the filtered background.

15 Claims, 7 Drawing Sheets

INFRARED PRESENCE SENSING WITH MODELED BACKGROUND SUBTRACTION

FIELD OF THE INVENTION

The present invention relates to sensors and more particularly, is related to thermal sensing devices.

BACKGROUND OF THE INVENTION

Infrared (IR) detectors, for example, far IR detectors may be operated with additional optical elements, such as multifocal Fresnel lenses. For example, pyro-electric detectors traditionally consist of two oppositely connected heat sensing elements. The two heat sensing elements cancel out commonly received radiation, such as impinging sunlight, and thus need an optical system illuminating the radiation of a localized moving heat-spot for example, a person, onto only one of both elements.

Figure 1A:
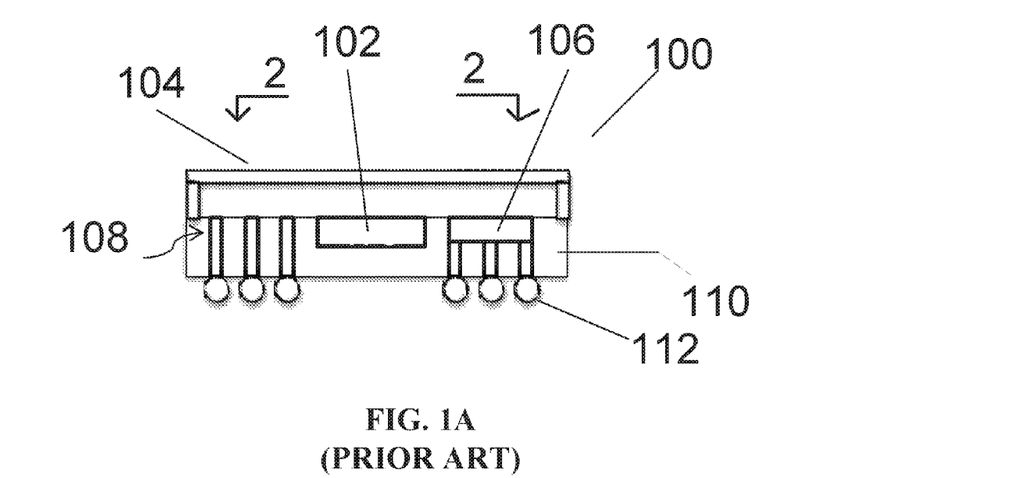
FIG. 1A is a schematic, cross-sectional side view of an exemplary detector, in accordance with the prior art.

FIG. 1 is a schematic, cross-sectional side view of a typical detector 100 configured to detect the position, motion and/or direction of a living being (e.g., a human) within a monitored space. In general, the phrase "monitored space" refers to a physical area (e.g., a room, hallway, outdoor area, etc.) where the detector 100 is positioned and where the detector 100 can potentially detect the living being. The field of view (FOV) of the detector describes a region where the detector is capable of sensing a warm object, and may be a portion of the monitored space, or may include all of the monitored space.

The detector 100 has a sensor module 102 with one or more thermal sensing devices (e.g., thermopiles) and a lens array 104 at least partially covering the sensor module 102. The lens array 104 has a plurality of lenses, each of which is arranged to direct incident thermal energy from the monitored space onto at least part of the sensor module 102. Each individual lens may direct incident thermal energy from one of multiple different physical zones in the monitored space onto the sensor module 102.

An integrated circuit 106 that may, in various implementations, form a computer-based processor, a computer-based memory storage device and/or other circuitry to perform and/or support one or more of the functionalities described herein. Electrical conductors (e.g., traces that extend along the upper and/or lower surfaces of the substrate 110, vias 108 that extend through the substrate, solder bumps 112, etc.) are provided to connect the electrical components of the detector 100 to external components.

Thermal sensing devices such as thermopiles or photonic detectors are generally operable to produce a direct current (DC) output that is substantially proportional to an amount of thermal energy being received at that thermal sensing device. The DC output produced by such a thermal sensing device generally remains constant as long as the amount of thermal energy being delivered to that thermal sensing device remains generally constant. Increases in the amount of thermal energy being delivered to the thermal sensing device generally result in a proportional increase in the DC output being produced by that sensing device. Likewise, decreases in the amount of thermal energy being delivered to the thermal sensing device result in a proportional decrease in the DC output being produced by that sensing device. The DC output from the thermal sensing devices may be either a DC voltage or a DC current.

Present motion detectors typically employ pyroelectric materials, often in conjunction with the lens array 104 to detect the movement of people in a room. A pyroelectric material generates a signal if the incoming heat radiation (from a heat source such as a human body) changes. Mathematically, the pyroelectric detector generates an electrical signal that follows the time derivative of the incoming heat flux. Thus, if a person enters or leaves the detector FOV, the heat flux changes and a respective signal is generated. The amplitude of the signal is dependent on the temperature of the heat source and the so-called filling factor of the FOV. The higher the temperature of the source and the more the source fills the FOV of the detector, the higher the resulting signal.

A warm object radiates heat which can be sensed with thermal sensors such as pyroelectric sensors, thermopiles, bolometers, etc. In case the object is moving through the field of view of such sensors, the amount of radiation changes over time. To distinguish the variation in time from the movement of that object (the signal) from a variation in time which originates from local heat sources that change in temperature and thus the amount of radiation (the background), the background may be removed from the signal. This is called background subtraction.

Figure 1B:
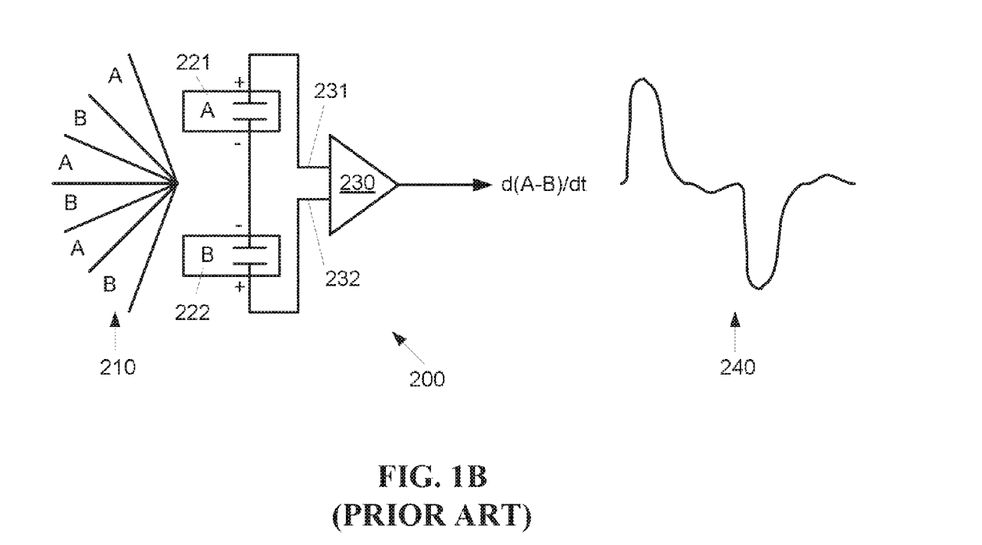
FIG. 1B is a schematic drawing showing a simplified dual-element pyroelectric detector with schematic optics and electronics, in accordance with the prior art.

Traditionally pyroelectric detectors implement a combination of a scrambling optic and at least two sensing elements separated in space. The scrambling optics segment portions of the FOV the object is moving through into segments such that the change of net radiation on one of the elements is fast enough to be sensed, and the net radiation seen by the individual elements is significantly different. This approach is depicted by FIG. 2. At least 2 sensing elements 221, 222 are connected together such that commonly received radiation is canceled out at the electrical output 231, 232 and does not give any variation of the resulting signal 230 over time 240. If the ambient for example is heating up or cooling down, the amount of radiation rises or falls but is commonly seen by both elements and thus not sensed. To generate a signal 240 in that sensing element combination, one sensing element 221 must see a different amount of radiation than the other sensing element 222.

To observe movement of the object in the field of view of the sensor, the radiation received on the sensor varies in space as well as time. This is realized by scrambling optics which project the position of the object on one of the elements 221, 222 depending on the position of the object in the FOV. A movement of the object through the FOV results in an unbalanced change of the radiation on the sensing elements which in turn generates a non-zero signal 240. In general the object must change the position from one zone (AB 210) to another (B/A 210) in order to be sensed. Objects remaining in one zone are not sensed.

However, traditional single-element pyro-electric detectors cannot sense a DC component of the received radiation, and thus have used a modulated radiation to provide an output to back end processing electronics. Therefore, there is a need in the industry to overcome one or more of these limitations.

SUMMARY OF THE INVENTION

Embodiments of the present invention provide infrared presence sensing with modeled background subtraction. Briefly described, the present invention is directed to a motion sensing device with an infrared radiation (IR) sensor configured receive signal IR from a warm object and background IR to produce a direct current output. A first transformation filter receives the direct current output and produces a filtered background. A second transformation filter receives the direct current output and produces a filtered signal. A rating compares the filtered signal and the filtered background to produce a result signal based on a detected difference between the filtered signal and the filtered background.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

The following definitions are useful for interpreting terms applied to features of the embodiments disclosed herein, and are meant only to define elements within the disclosure.

As used herein, a "detector" refers to a thermal sensing device with one or more thermal sensing elements. A single-element detector contains a single thermal sensing element, while a multi-element detector contains two or more thermal sensing elements. For example, a multi-element detector may include hundreds or thousands of individual thermal sensors or pixels.

Reference will now be made in detail to embodiments of the present invention, examples of which are illustrated in the accompanying drawings. Wherever possible, the same reference numbers are used in the drawings and the description to refer to the same or like parts.

Figure 3:
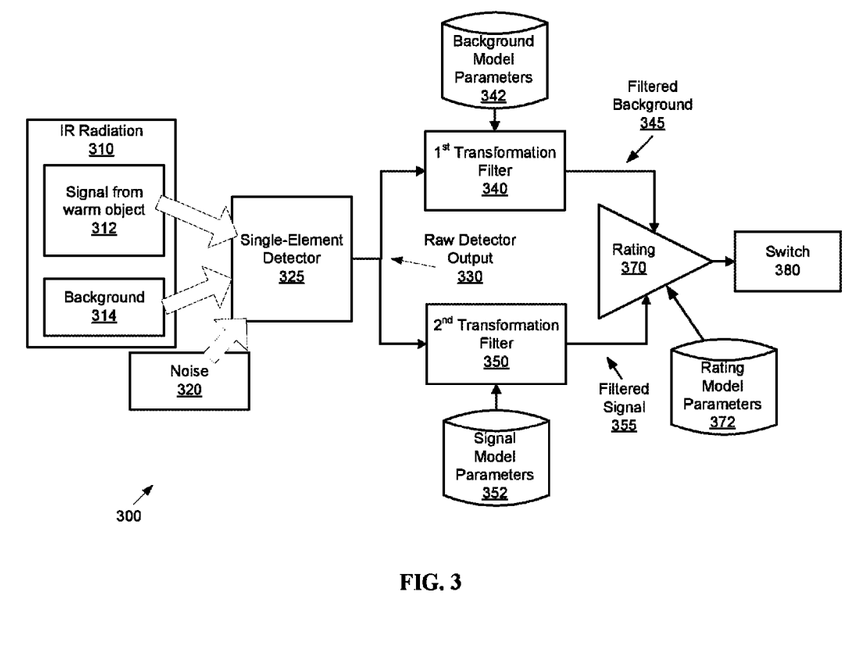
FIG. 3 is a schematic diagram of a first embodiment of a motion and presence sensing device.

A first exemplary embodiment of a motion sensing device 300, shown in FIG. 3 may operate with a single-element detector 325. The single-element detector 325 may be similar to the typical detector 100 (FIG. 1), having a single sensing element 102 (FIG. 1) which is able to sense even very slow variations of radiation down to static cases, for example, a thermopile, a bolometer, photonic sensors, and/or semiconductor-based IR sensors (bulk or epitaxial, intrinsic or extrinsic, etc.). The single-element detector 325 is generally configured to produce a direct current (DC) or voltage output that is substantially proportional to an amount of thermal energy being received. Such a single-element detector 325 may optionally be equipped with scrambling optics 104 (FIG. 1).

Compared with the earlier detectors, under the first embodiment the warm object may move in any direction (in contrast to the traditional approach with a segmented space) and the movement generally results in a variation of the radiation in time received by the motion sensing device 300. Trivially, a steady state ambient background may be measured and subtracted from the motion sensing device 300 output. However, changes to the ambient background with time effectively defeats this approach.

A warm foreground object may be distinguished from the background (for example a change of the temperature of the ambient) by a time based signal analysis. The first embodiment applies a model of the background, which may have different functional properties, for example, rise or fall time of the signal, signal form, and signal amplitude, among others. This model may be used to filter/separate the background from the signal which has substantially different functional properties in time.

Figures 2A, 2B:
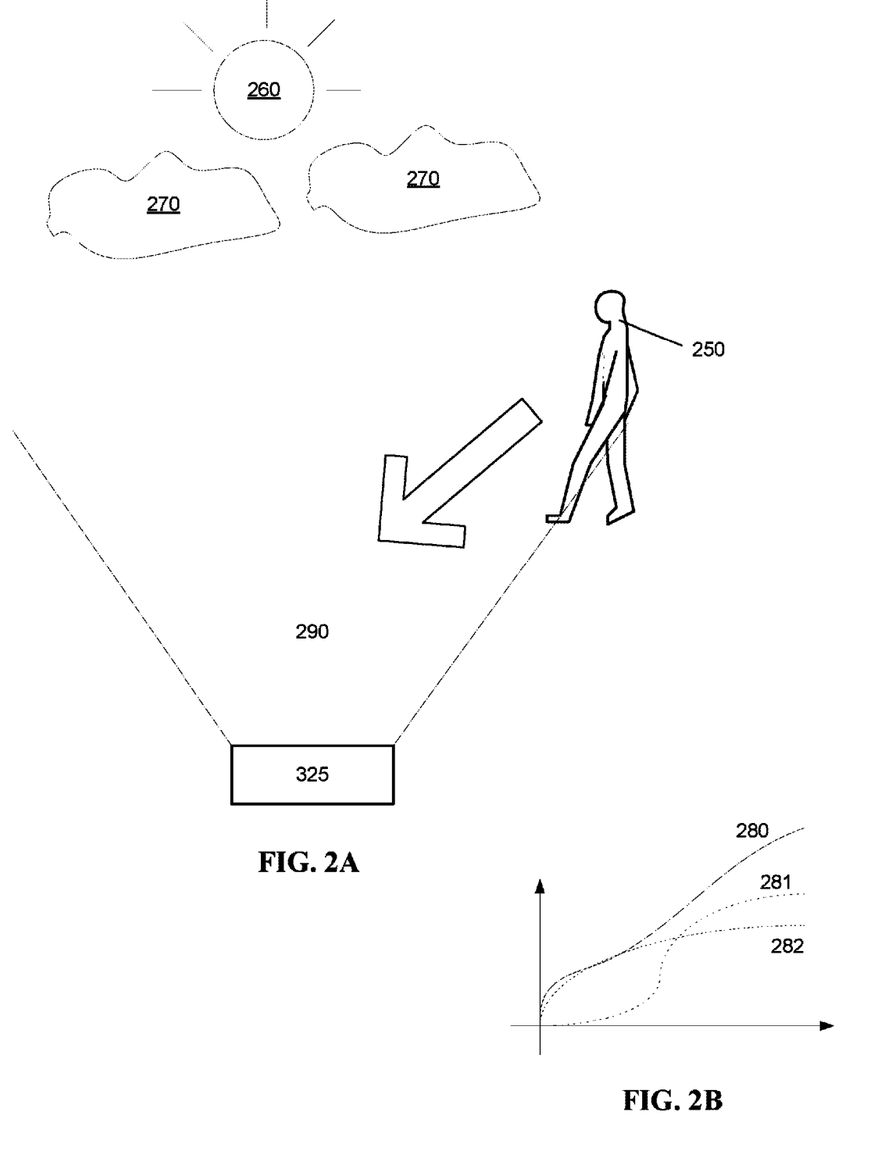
FIG. 2A is a schematic diagram representing an object of interest and a background in the field of view of an exemplary detector.
FIG. 2B plots the amplitude of the signal, background, and sum of the scene shown by FIG. 2A over time.

To illustrate the idea, the following simple example is illustrated by FIGS. 2A and 2B. An object of interest 250, for example, a person, is in the FOV 290 of the single-element detector 325, and the FOV 290 is exposed to sunlight, for example, via a window in the monitored space. The sun 260 is shining but clouds 270 are passing by, resulting in the background area monitored within the FOV 290 of the single-element detector 325 randomly heating up and cooling. The object of interest 250 is moving in the FOV 290 toward the single-element detector 325, and the amount of radiation received by the sensor due to the object of interest is denoted as "signal," denoted as a dash-dot line in FIG. 2B, is increasing as the object of interest approaches the single-element detector 325. The signal 281 may be subtracted from the background 282, denoted as a dashed line. The total output of the single-element detector 325 represents the sum 280 of the signal 281 and background 282, is represented as a solid line in the graph in FIG. 2B. Since the signal 281 is rising significantly faster than the background 282, the background 282 can be filtered by the application of a simple low-pass with a time constant comparable to the one of the background in order to subtract the filtered signal from the sum 280. What remains is the signal 281 which may be analyzed by means of simple thresholds.

In other embodiments, a model of the signal may be applied to the sum which is seen by the single-element detector 325. Then a simple subtraction of the filtered signal and filtered background may be evaluated by means of thresholds. More sophisticated signal analysis, for example, fast Fourier transform (FFT), fitting of functions, machine learning and modeling, among others, may be applied to this basic principle to further improve distinction between the signal and the background. This principle is not restricted to the time domain, but may be performed with any other mathematical transformation, for example, frequency domain, Laplace-transformations, multi-variable expansions, etc.

The first embodiment is not restricted to the above example. Any source can be denoted as "signal" and another as "background" as long as the behavior of the radiation in time of both sources can be modeled and/or described in a separable way. The background may be for example a person moving in a large distance from the sensor and the signal may be a person moving in the foreground of the FOV. The background/signal may be sources with different amplitudes in the amount of radiation produced (cars, pets, persons, fires, etc.) but same spatial position. The embodiments described herein are not restricted to spatial changes. For example the detector 300 may distinguish a local fire from a heater, or a pet/child may be distinguished from an adult human.

Exemplary embodiments of the present invention include single-element background subtracted thermopile sensor (TP), which may be operated without additional optical elements, such as multifocal Fresnel lenses.

Under the first embodiment, a detector including a thermopile sensor provides a current or voltage which is proportional to the net radiation and senses DC components. Thus a resting heat-spot, such as an immobile human, may be sensed after being separated from any detected background radiation, which may be produced by a heater, a varying sun load, air-conditioning etc. The first embodiment incorporates subtraction of that background by modeling techniques described in further detail below.

The simplest background subtraction may be realized by the measurement of the net radiation without the object of interest being present, thereby only measuring the background. The recorded value is used as an offset to be subtracted from the sensor output. An object moving into the field-of-view of the TP may be recognized by a simple threshold on the offset-subtracted signal. However, simple background subtraction may be insufficient when the ambient conditions are changing with time, thereby invalidating the offset.

FIG. 3 is a schematic diagram of a first embodiment of a sensing device 300. IR radiation 310 includes a signal 312 from a warm object, for example, a person 250 (FIG. 2A) and background radiation 314, for example, ambient heat within the FOV of the sensing device 300. The sensing device 300 discerns the presence and/or motion of a warm object in the FOV to generate an action, for example, in a switch 380. For example, the switch 380 may be actuated as a result of detection and/or lack of detection of the warm object in the FOV. The device 300 splits the raw output of the single-element detector 325 for independent processing of background and signal to determine the action of the switch 380. In other embodiments the output of the sensing device 300 may be something other than the switch 380, for example, an output signal, or a visual indicator, such as an indicator lamp or an indicator icon on a display monitor.

The single-element detector 325 detects the IR radiation 310, along with some noise 320, for example, self-noise, or system noise. The single-element detector 325 provides a raw data output 330, for example, an analog voltage/current level, or a digital conversion of such an analog output signal, for example from an analog-to-digital converter (ADC), which is proportional to the received net IR radiation 310. It should be noted that in a third embodiment, described below, a multi-sensor detector may produce multiple output signals from each sensor, and/or an aggregate output signal from each of the sensors. For the first embodiment, the single-element detector 325 has a single sensor producing a single raw data output 330.

The raw detector output 330 may be split, for example, with a mux (not shown) and fed into two or more data analysis branches. For simplicity, only two branches are described under the first embodiment. However, in alternative embodiments three or more branches may be used, for example, to distinguish multiple signals from one another and the background. A first branch is fed into a first transforming filter 340 producing a filtered background 345, and a second branch is routed to the input of a second transformation filter 350 producing a filtered signal 355. The first transforming filter 340 may transform the raw data as a function of time into a variable which can separate background from the signal and noise, resulting in the filtered background signal 345. The second transforming filter 350 may transform the raw data as a function of time into a variable which can separate the signal from the background and noise. The transformation filters 340, 350 may be steered by variable parameters, for example, background model parameters 342 and signal model parameters 352, for example, frequency ranges, amplitude ranges, etc.

In general, the first transforming filter 340 and the second transforming filter 350 may have dissimilar mathematical operation. A comparison, for example, performed by a rating device 370, for example, a comparator, is performed to distinguish the filtered background 345 from the filtered signal 355 before a decision to change the state of a switch 380 is taken. For example, the rating may determine that the filtered signal 355 is sufficiently distinguishable from the filtered background 345 to indicate the presence/absence/motion of a warm object in the FOV of the motion sensing device 300. The rating 370 may access a store of rating model parameters 372, for example, thresholds, time constants, tolerance windows, signal variance indicators, etc.

Figure 4:
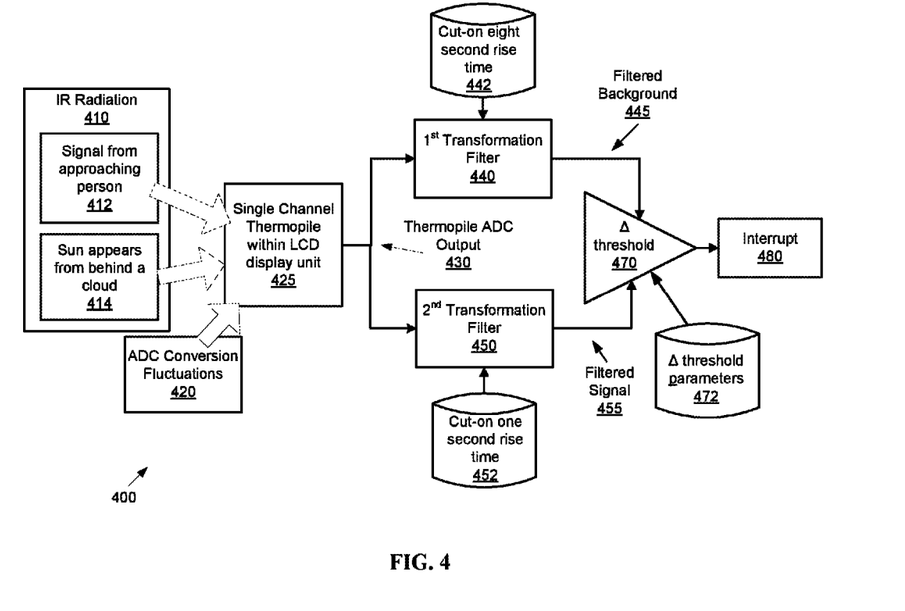
FIG. 4 is a schematic diagram of a second embodiment of a motion and presence sensing device.

FIG. 4 shows a second exemplary embodiment of a motion sensing device 400. It is desirable that a liquid crystal display (LCD) with an integral single channel thermopile 425 screen may sense IR radiation 410 from an approaching person while the sun is heating up a surrounding room in the FOV of the motion sensing device. The single channel thermopile 425 senses a slowly rising component from the sun 414 and a rapidly rising signal component from the person 212. Applying a first transformation filter 440, for example, a low pass filter with a cut-on eight second rise time 442 on the thermopile ADC output 430 signal removes the signal component and any ADC fluctuations 420, producing a filtered background 445. While the filtered background 445 may be subtracted from the thermopile ADC output 430, a second transformation filter 450, for example, a low pass filter with a cut-on one second rise time 452 on the thermopile ADC output 430 signal removes the background component and any ADC fluctuations 420, producing a filtered signal 455. A threshold comparator 470 may be applied to perform an action, for example, an interrupt 480 used to turn the LCD on within the LCD display unit 425.

The threshold comparator 470 may access one or more sets of threshold parameters 472 to adapt to different detection scenarios, as may the transformation filters 440, 450. For example the background may be an air flow which provides a fast change of the raw data output due to air turbulences. If the background fluctuations are faster than the motion of the person, a low pass filter stage not only separates the signal from the ADC fluctuations, but also from the air turbulences. This improves the result after subtraction of the filtered background 445 from the filtered signal 455. Changing one or more parameter for the signal to a higher cut-off value may result in suppressing the signal of a person moving in front of the sensor 425 which would trigger further events, even if the person is in the field of view of the sensor 425. With such a higher cut-off parameter, a delay may be steered to switch the sensor 425, thus a person passing through the FOV of the sensor 425 may be differentiated from a stationary person.

Changing the filter parameters of the first and second transformation filters 440, 450 may be used, for example, to distinguish a fast temperature change from a slow one temperature, such as burning power electronics. Similarly, other than performing a filter operation, distinguishing two or more inputs to the thermopile 425 may be realized using other types of mathematical operations.

Returning to FIG. 3, a model may be applied to the thermopile ADC signal as a function of time which for recognizing specific signatures, such as a signature signal produced by a person is walking through the FOV of the single-element detector 325 (FIG. 3), a dog is passing through the FOV, and a car is passing through the FOV. These 3 cases may be distinguished by a combination of the signal amplitude, signal speed and eventually a signal pattern. This model can be analyzed by the means of a multivariable expansion. Passing the raw data through this filtering stage produces a likelihood that the object passing through the FOV is a person, car or pet. The output of the device may be a likelihood estimation indicating the closest match. For periodic signals, Fourier transformations may be used. For example, a fast Fourier transform (FFT) output may distinguish a periodic background from a non-periodic signal.

A model is applied to the background component which follows the background signature as a function of time. The model may be determined in various different ways. For example, the model may provide dynamic analysis of the detector output 350 without relying on previously stored (memorized) data.

The analysis may be performed by filtering the background out and subtracting it afterwards. For example, if the signal is varying very slowly, a simple low-pass stage may be applied which does not respond to a fast change of the thermopile output when the object is moving in the field-of-view. The result can be improved by "filtering" the signal with a low-pass of faster response as well to be subtracted afterwards.

If a signature of the background IR radiation 314 is predictable, for example by a model, the signature of the background IR radiation 314 may be applied directly. The learning procedure may be performed in a parameter space, which may be suitable to separate the background 345 from the signal 355. The learning procedure may be performed, for example, by a mathematical (multi) variable expansion, such as a Fourier transform, Laplace transform or others, where the data is transformed into the frequency domain, or other domains. Instead, or in addition, the learning may be performed in time domain as well.

Figure 6:
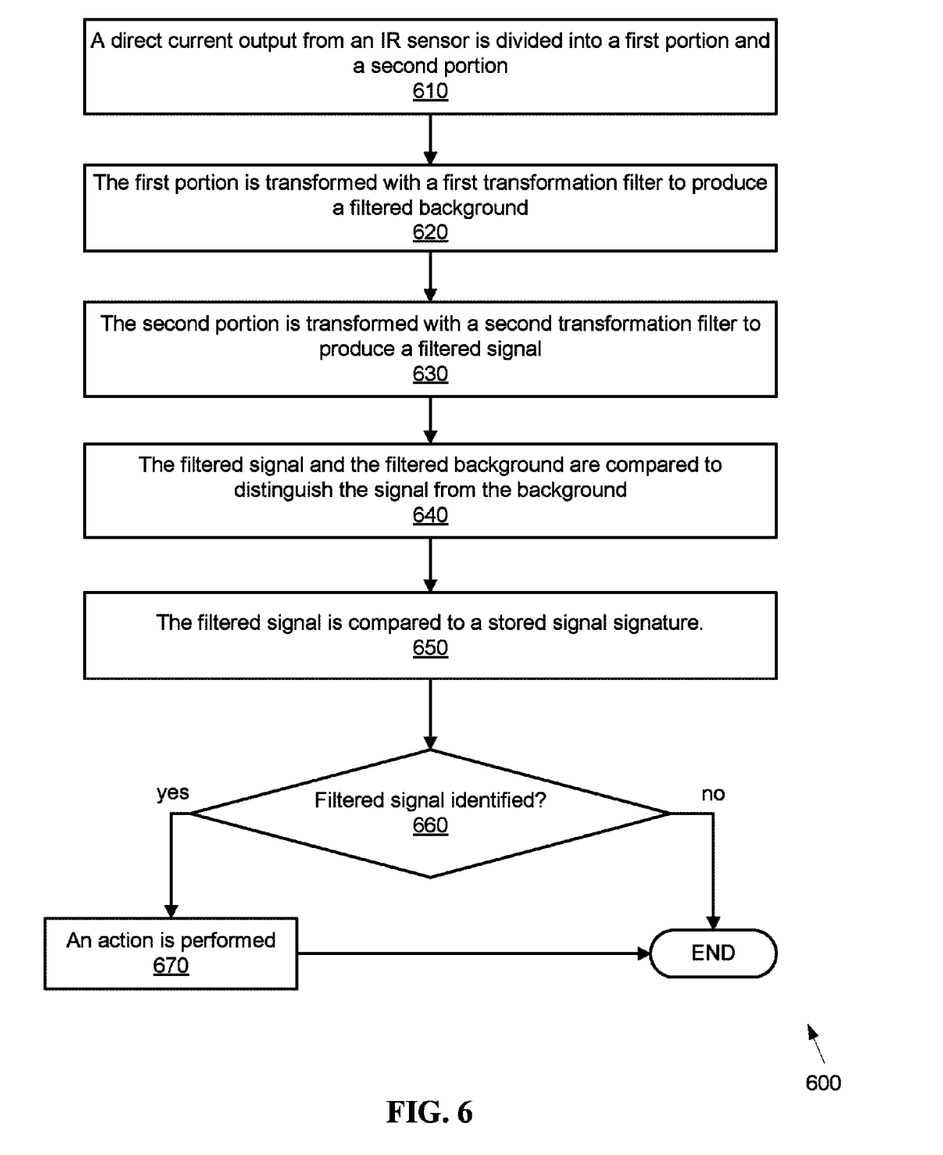
FIG. 6 is a flowchart of an exemplary method for distinguishing a signal from the background of a single-element thermal sensor.

FIG. 6 shows an exemplary embodiment of a method 600 for distinguishing a signal of interest from a background from the output of a single-element infrared radiation (IR) sensor 325 (FIG. 3). The steps of the method 600 will be made with reference to elements shown by FIG. 3. However, persons having ordinary skill in the art will appreciate this method is also applicable to the multi-element IR sensor of FIG. 7, described below. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A direct current output 330 from an IR sensor 325 is divided into a first portion and a second portion, for example, via a mux (not shown) as shown by block 610. The first portion is transformed with a first transformation filter 340 to produce a filtered background 345, as shown by block 620.

The second portion is transformed with a second transformation filter 350 to produce a filtered signal 355, as shown by block 630. The filtered signal and the filtered background are compared, for example, by a rating 770, as shown by block 640, to distinguish the signal from the background. The rating 770 may access a store of rating model parameters 772, for example, to adapt to different comparison scenarios. The filtered signal is compared to a stored signal signature, as shown by block 650. For example, the stored signal signature may include a range of parameters and/or thresholds used in the comparison step to determine if the filtered signal 355 and/or the filtered background 345 matches, or is similar in one or more aspects, to the stored signal signature. If the filtered signal is identified as shown by block 660, for example, if the filtered signal matches the stored signal signature, an action is performed, as shown by block 670, for example, actuating a switch 380. Alternatively, the action 670 may be performed even if the filtered signal 355 is not positively identified, but is clearly differentiated from the filtered background 345.

While the term "filter" is used herein regarding the first transformation filter 340 and the second transformation filter 350, a person having ordinary skill in the art will appreciate the first and/or second filter 340, 350 may include other mathematical modeling processes in the time and/or frequency domain, in addition to or instead of traditional high pass, low pass, bandpass, or notch filtering. For example, the first and/or second transformation filter 340, 350 may include fitting of functions, a Fourier transform, such as an FFT, a Laplace transform, a multi-variable expansion, among other operations, on the raw detector output 330.

Figure 7:
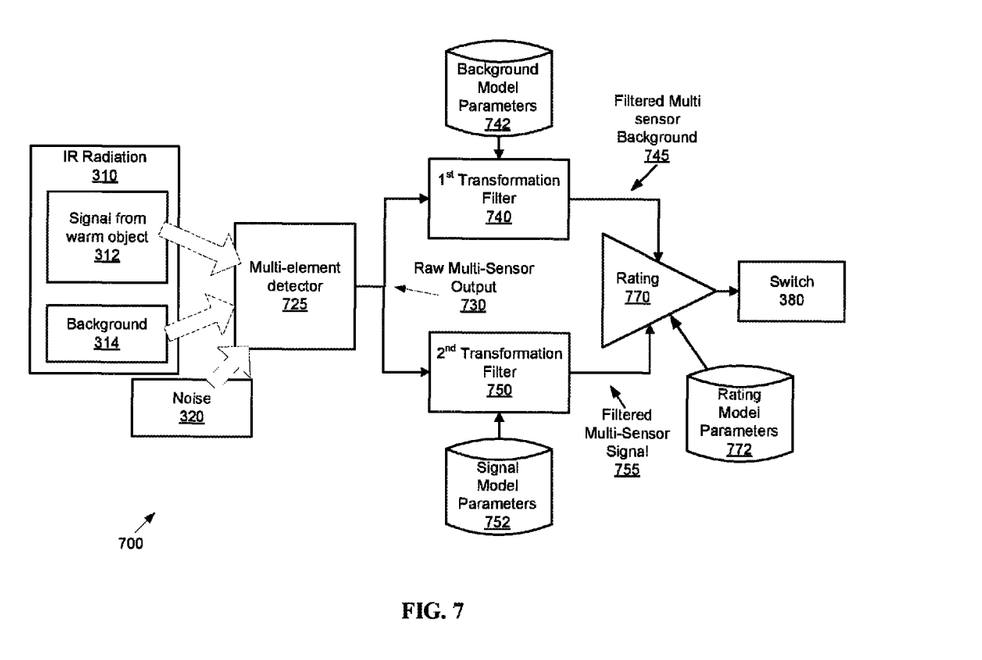
FIG. 7 is a schematic diagram of a third embodiment of a motion and presence sensing device.

FIG. 7 shows a third embodiment of a motion sensing device 700 where a multi-element sensor (detector) 725 is used instead of the single-element sensor 325 (FIG. 3) of the first embodiment. The multi-element sensor 725 may have 2, 3, 4, or more elements, for example, a multi-pixel sensor.

The third exemplary embodiment of a sensing device 700 shown by FIG. 7 may operate with a multi-element detector 725 having multiple sensing elements, for example, thermopiles, bolometers, photonic sensors, semiconductor-based IR sensors (bulk or epitaxial, intrinsic or extrinsic, etc.), able to sense even very slow variations of radiation down to static cases. The multi-element detector 725 is generally configured to produce a direct current (DC) output that is substantially proportional to an amount of thermal energy being received. Such a multi-element detector 725 may optionally be equipped with scrambling optics 104 (FIG. 1).

IR radiation 310 may include a signal 312 from a warm object, for example, a person 250 (FIG. 2A) and background radiation 314, for example, environmental heat. The sensing device 700 discerns the presence and/or motion of a warm object to generate an action in a switch 380. For example, the switch 380 may be actuated as a result of detection and/or lack of detection of the warm object. The sensing device 700 splits the signal of the multi-element detector 725 into two or more branches for independent processing of background and signal to determine the action of the switch 380. In other embodiments the output of the system may be something other than the switch 380, for example, an output signal, or an indicator for viewing on a display device or monitor.

The multi-element detector 725 detects the IR radiation, along with some noise 320, for example, self-noise, or system noise. The multi-element detector 725 provides a raw multi-sensor output 730, for example, an analog voltage/current level, or a digital conversion of such an analog output signal, for example, by an analog to digital converter (ADC), which is proportional to the received net IR radiation 310. For the third embodiment, the multi-element detector 725 has two or more sensors producing the raw multi-sensor output 730.

The raw multi-sensor output 730 may be split and fed into two or more data analysis branches. A first branch is fed into a first transforming filter 740 producing a filtered background 745, and a second branch is routed to the input of a second transformation filter 750 producing a filtered signal 755. The first transforming filter 740 transforms the raw data as a function of time into a variable which can separate background from the signal and noise, resulting in the filtered background signal 745. The second transforming filter 750 may transform the raw multi-sensor output 730 as a function of time into a variable which can separate the signal from the background and noise. The transformation filters 740, 750 may be steered by variable parameters, for example, background and signal model parameters 742, 752.

Generally, the first transforming filter 740 and the second transforming filter 750 may have dissimilar mathematical operation. A comparison, for example, by a rating 770 is performed if the background was sensed and/or distinguished from the signal before the decision to change the state of a switch 380 is made.

Figure 5:
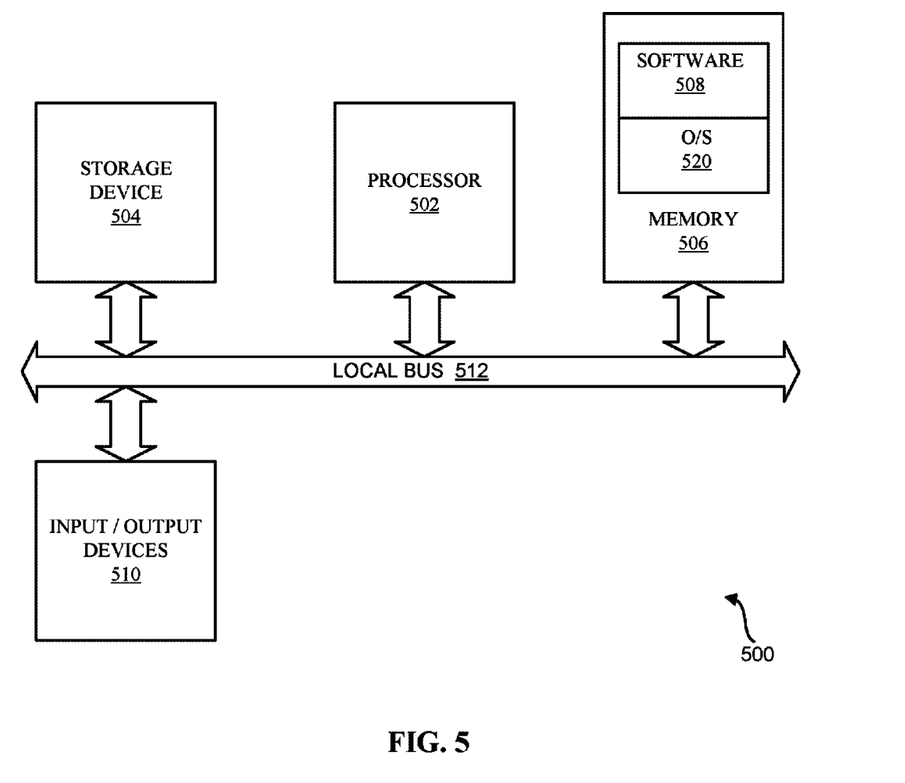
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. For example, in some embodiments, the difference between two low-pass filtered signals may not be able to sense presence of a human entering the field-of-view by only measuring a positive value above a threshold but also by measuring the absence of the signal after the human has left the field-of-view. The human may be considered to become part of the background, for example, when the human is resting longer than the time constant of the background filter.

In some embodiments, the time-constant of the background filter (as well as the signal filter) may be reduced to a fast response when the object is sensed in order to reach the zero difference between the two filters faster (reset) and be ready to sense the absence of the object. When the object is exiting the field-of-view again, fast filter settings may be chosen to reset the system for when the same object or a different object enters the FOV.

Periodic behavior of background may be implemented to be subtracted in order to forecast the background. This can be a simple case such as day-night temperature fluctuations but can be expanded to machine learning by recording the repetitive behavior of any background.

In view of the foregoing, it is intended that the present invention cover modifications and variations of this invention provided they fall within the scope of the following claims and their equivalents.

What is claimed is:

1. A device, comprising:
    an infrared radiation (IR) sensor configured to receive signal IR from a warm object and background IR to produce a direct current output;
    a first transformation filter configured to receive the direct current output and produce a filtered background;
    a second transformation filter configured to receive the direct current output and produce a filtered signal; and
    a rating configured to compare the filtered signal and the filtered background and produce a result signal based on a detected difference between the filtered signal and the filtered background,
    wherein the IR sensor is a single-element sensor.

2. The device of claim 1, further comprising an analog to digital converter (ADC) configured to convert the direct current output to a digital representation.

3. The device of claim 1, further comprising a switch configured to receive the result signal and actuate according to the received result signal.

4. The device of claim 1, further comprising a first memory in communication with the first transformation filter configured to store background model parameters.

5. The device of claim 4, further comprising a second memory in communication with the second transformation filter configured to store signal model parameters.

6. The device of claim 5, further comprising a third memory in communication with the rating configured to store rating model parameters.

7. The device of claim 1, wherein the first transformation filter and/or the second transformation filter is selected from the group consisting of:
    a low pass filter;
    a bandpass filter;
    a Fourier transform;
    a Laplace transform; and
    a multi-variable expansion.

8. The device of claim 1, wherein the first transformation filter and/or the second transformation filter comprises a frequency domain process.

9. A method for distinguishing a signal of interest from a background from the output of a single-element infrared radiation (IR) sensor; comprising the steps of:
    dividing a direct current output from the IR sensor into a first portion and a second portion;
    transforming the first portion with a first transformation filter to produce a filtered background;
    transforming the second portion with a second transformation filter to produce a filtered signal;
    comparing the filtered signal and the filtered background to distinguish the filtered signal from the background;
    comparing the filtered signal to a stored signal signature; and
    if the filtered signal matches the stored signal signature, performing a first action.

10. The method of claim 9, further comprising the step of deriving a set of background model parameters to isolate the filtered background.

11. The method of claim 10, further comprising the step of applying the background model parameters to the first transformation filter.

12. The method of claim 9, further comprising the step of deriving a set of signal model parameters to isolate the filtered signal.

13. The method of claim 12, further comprising the step of applying the signal model parameters to the second transformation filter.

14. The method of claim 9, further comprising the step of deriving a set of rating model parameters.

15. A device, comprising:
    an infrared radiation (IR) sensor configured to receive signal IR from a warm object and background IR to produce a direct current output;
    a first transformation filter configured to receive the direct current output and produce a filtered background;
    a second transformation filter configured to receive the direct current output and produce a filtered signal; and
    a rating configured to compare the filtered signal and the filtered background and produce a result signal based on a detected difference between the filtered signal and the filtered background, wherein the IR sensor comprises a plurality of sensing elements.

* * * * *